US011179744B2

(12) United States Patent
Morgan et al.

(10) Patent No.: US 11,179,744 B2
(45) Date of Patent: Nov. 23, 2021

(54) SEGMENTED DISTRIBUTION ASSEMBLY FOR DISTRIBUTING FLUID TO AN APPLICATOR NOZZLE

(71) Applicant: GASTON SYSTEMS, INC., Stanley, NC (US)

(72) Inventors: Jerry D. Morgan, Gastonia, NC (US); Robert H. Kennedy, Mount Holly, NC (US)

(73) Assignee: GASTON SYSTEMS, INC., Stanley, NC (US)

( * ) Notice: Subject to any disclaimer, the term of this patent is extended or adjusted under 35 U.S.C. 154(b) by 0 days.

(21) Appl. No.: 16/683,251

(22) Filed: Nov. 13, 2019

(65) Prior Publication Data

US 2020/0188951 A1 Jun. 18, 2020

Related U.S. Application Data

(60) Provisional application No. 62/760,198, filed on Nov. 13, 2018.

(51) Int. Cl.
*B05C 11/10* (2006.01)
*B05C 5/00* (2006.01)
(Continued)

(52) U.S. Cl.
CPC ............ *B05C 11/1044* (2013.01); *B05B 1/20* (2013.01); *B05C 5/00* (2013.01); *B05C 5/0254* (2013.01); *B29C 48/695* (2019.02)

(58) Field of Classification Search
CPC .......................................... B05C 5/0254–0291
See application file for complete search history.

(56) References Cited

U.S. PATENT DOCUMENTS 837,439 A * 12/1906 Wallace ............... B23D 61/125
83/838
2,114,618 A 4/1938 Wallin
(Continued)

FOREIGN PATENT DOCUMENTS

BR PI 0812111-7 6/2017
CN 208917497 U 5/2019
(Continued)

OTHER PUBLICATIONS

"International Search Report" and "Written Opinion" of the International Search Authority (ISA/US) in Gaston Systems, Inc., International Patent Application Serial No. PCT/US2019/061334, dated Feb. 28, 2020 (6 pages).

*Primary Examiner* — Binu Thomas
(74) *Attorney, Agent, or Firm* — Tillman Wright, PLLC; James D. Wright; David R. Higgins

(57) ABSTRACT

An inner plate assembly for arrangement between top and bottom plates of an applicator for applying fluid-based chemicals to traveling sheets of textile substrates includes a plurality of interlocking plate segments. Each interlocking plate segment includes an outer frame segment and one or more baffle member segments supported by the outer frame segment. Each interlocking plate segment further includes a first interlocking structure disposed at a first end thereof and a second interlocking structure at a second, opposite end thereof to facilitate end-to-end interlocking arrangement of the plurality of interlocking plate segments.

19 Claims, 14 Drawing Sheets

(51) Int. Cl.
*B05C 5/02* (2006.01)
*B05B 1/20* (2006.01)
*B29C 48/695* (2019.01)

(56) References Cited

U.S. PATENT DOCUMENTS

| | | | |
|---|---|---|---|
| 2,992,627 A | 7/1961 | Ring | |
| 3,042,573 A | 7/1962 | Roberts | |
| 3,067,758 A | 12/1962 | Hersh | |
| 3,666,303 A * | 5/1972 | Huis | F16B 12/02 |
| | | | 312/352 |
| 3,667,153 A * | 6/1972 | Christiansen | F16B 5/07 |
| | | | 446/124 |
| 3,832,427 A | 8/1974 | Mutch | |
| 3,969,780 A | 7/1976 | Henderson | |
| 4,016,831 A | 4/1977 | James et al. | |
| 4,023,526 A | 5/1977 | Ashmus et al. | |
| 4,061,001 A | 12/1977 | von der Eltz et al. | |
| 4,062,989 A | 12/1977 | Long | |
| 4,064,891 A | 12/1977 | Eberhardt | |
| 4,072,775 A | 2/1978 | James et al. | |
| 4,074,625 A | 2/1978 | Mitter | |
| 4,089,296 A | 5/1978 | Barchi | |
| 4,099,913 A | 7/1978 | Walter et al. | |
| 4,118,183 A | 10/1978 | Godau et al. | |
| 4,159,355 A | 6/1979 | Kaufman | |
| 4,193,762 A | 3/1980 | Namboodri | |
| 4,225,638 A | 9/1980 | Waugh | |
| 4,237,818 A | 12/1980 | Clifford et al. | |
| 4,239,821 A | 12/1980 | McLean et al. | |
| 4,283,198 A | 8/1981 | Fletcher | |
| 4,292,918 A | 10/1981 | Davis et al. | |
| 4,297,860 A | 11/1981 | Pacifici et al. | |
| 4,299,591 A | 11/1981 | Gregorian et al. | |
| 4,305,169 A | 12/1981 | Vidalis | |
| 4,326,904 A | 4/1982 | Eckert et al. | |
| 4,343,835 A | 8/1982 | Jones et al. | |
| 4,349,930 A | 9/1982 | Van Wersch et al. | |
| 4,357,373 A | 11/1982 | Cooper | |
| 4,364,784 A | 12/1982 | Van Wersch et al. | |
| 4,365,968 A | 12/1982 | Gregorian et al. | |
| 4,384,867 A | 5/1983 | Gruber | |
| 4,387,118 A | 6/1983 | Shelton | |
| 4,394,289 A | 7/1983 | Brown et al. | |
| 4,398,665 A | 8/1983 | Bryant et al. | |
| 4,402,200 A | 9/1983 | Clifford et al. | |
| 4,407,767 A | 10/1983 | Seaborn | |
| 4,408,995 A | 10/1983 | Guth et al. | |
| 4,420,510 A | 12/1983 | Kunkel et al. | |
| 4,431,429 A | 2/1984 | Booth | |
| 4,435,965 A | 3/1984 | Sasseville et al. | |
| 4,442,144 A | 4/1984 | Pipkin | |
| 4,444,104 A | 4/1984 | Mitter | |
| 4,463,467 A | 8/1984 | Gruber et al. | |
| 4,463,583 A | 8/1984 | Kruger et al. | |
| 4,473,521 A | 9/1984 | Tassone | |
| 4,512,279 A | 4/1985 | Damrau et al. | |
| 4,532,782 A | 8/1985 | Sellers | |
| 4,562,097 A | 12/1985 | Walter et al. | |
| 4,613,335 A | 9/1986 | Berendt et al. | |
| 4,622,243 A | 11/1986 | Long | |
| 4,624,213 A | 11/1986 | Long et al. | |
| 4,624,813 A | 11/1986 | Long | |
| 4,637,940 A | 1/1987 | Long | |
| 4,641,404 A | 2/1987 | Seydel et al. | |
| 4,644,900 A | 2/1987 | Poterala | |
| 4,655,056 A | 4/1987 | Zeiffer | |
| 4,656,063 A | 4/1987 | Long et al. | |
| 4,661,399 A | 4/1987 | Anderson, Jr. et al. | |
| 4,685,368 A * | 8/1987 | Gardner | B23D 61/123 |
| | | | 83/661 |
| 4,711,792 A | 12/1987 | Long | |
| 4,741,924 A | 5/1988 | Long et al. | |
| 4,753,823 A | 6/1988 | Long | |
| 4,769,260 A | 9/1988 | Long | |
| 4,773,110 A | 9/1988 | Hopkins | |
| 4,792,252 A | 12/1988 | Kremer et al. | |
| 4,796,558 A | 1/1989 | Chartrand et al. | |
| 4,844,001 A | 7/1989 | Jones | |
| 4,884,893 A | 12/1989 | Zeiffer et al. | |
| 4,943,451 A | 7/1990 | Zimmer | |
| 4,944,078 A | 7/1990 | Nakade | |
| 4,970,039 A | 11/1990 | Long | |
| 5,008,131 A | 4/1991 | Bakhshi | |
| 5,009,932 A | 4/1991 | Klett et al. | |
| 5,063,646 A | 11/1991 | Zeiffer et al. | |
| 5,066,428 A | 11/1991 | Manlowe et al. | |
| 5,074,883 A | 12/1991 | Wang | |
| 5,089,296 A | 2/1992 | Bafford et al. | |
| 5,138,740 A * | 8/1992 | Goodnow | D21G 3/005 |
| | | | 100/174 |
| 5,145,527 A | 9/1992 | Clifford et al. | |
| 5,165,261 A | 11/1992 | Cho | |
| 5,168,731 A | 12/1992 | Vidalis | |
| 5,195,225 A | 3/1993 | Zeiffer et al. | |
| 5,201,959 A | 4/1993 | Fuller | |
| 5,202,077 A | 4/1993 | Marco et al. | |
| 5,219,620 A | 6/1993 | Potter et al. | |
| 5,277,041 A | 1/1994 | Ahrweiler et al. | |
| 5,323,629 A | 6/1994 | Aurich et al. | |
| 5,337,586 A | 8/1994 | Ronchi | |
| 5,340,609 A | 8/1994 | Arthur et al. | |
| 5,403,622 A | 4/1995 | Nishi et al. | |
| 5,409,733 A | 4/1995 | Boger et al. | |
| 5,418,009 A | 5/1995 | Raterman et al. | |
| 5,429,840 A | 7/1995 | Raterman et al. | |
| 5,480,295 A * | 1/1996 | Greve | B29C 44/467 |
| | | | 425/71 |
| 5,484,453 A | 1/1996 | Baehr et al. | |
| 5,494,491 A | 2/1996 | Gurley | |
| 5,505,995 A | 4/1996 | Leonard | |
| 5,516,273 A | 5/1996 | Delmore et al. | |
| 5,524,828 A | 6/1996 | Raterman et al. | |
| 5,525,373 A | 6/1996 | Chandler | |
| 5,533,445 A | 7/1996 | Bill | |
| 5,556,471 A | 9/1996 | Boccagno et al. | |
| 5,642,548 A | 7/1997 | Osbourn | |
| 5,654,031 A | 8/1997 | Delmore et al. | |
| 5,657,520 A | 8/1997 | Greenway et al. | |
| 5,882,573 A * | 3/1999 | Kwok | B05C 5/027 |
| | | | 264/510 |
| 5,887,519 A | 3/1999 | Zelko | |
| 5,891,812 A | 4/1999 | Honeycutt et al. | |
| 6,164,948 A * | 12/2000 | Cook | B29C 48/272 |
| | | | 425/186 |
| 6,355,073 B1 | 3/2002 | Godau | |
| 6,395,088 B1 | 5/2002 | Zeiffer | |
| 6,432,202 B1 | 8/2002 | Aurich | |
| 6,495,081 B2 * | 12/2002 | Benatti | B29C 48/307 |
| | | | 264/173.17 |
| 6,814,806 B2 | 11/2004 | Zeiffer et al. | |
| 6,852,196 B2 | 2/2005 | Capizzi | |
| 6,858,256 B2 | 2/2005 | Zeiffer | |
| 7,913,524 B2 | 3/2011 | Aurich et al. | |
| 2004/0016399 A1 * | 1/2004 | Zeiffer | B05C 5/0254 |
| | | | 118/411 |
| 2005/0241078 A1 | 11/2005 | Aurich et al. | |
| 2007/0266505 A1 | 11/2007 | Aurich et al. | |
| 2009/0282621 A1 | 11/2009 | Kennedy et al. | |
| 2018/0141326 A1 | 5/2018 | Beck et al. | |
| 2020/0165774 A1 | 5/2020 | Malpass et al. | |
| 2020/0224347 A1 | 7/2020 | Aurich | |

FOREIGN PATENT DOCUMENTS

| | | |
|---|---|---|
| DE | 3034803 A1 | 3/1982 |
| EP | 0525434 A1 | 2/1993 |
| EP | 0799924 A2 | 10/1997 |
| EP | 0995826 A2 | 4/2000 |
| EP | 1065308 A2 | 1/2001 |
| EP | 1657338 A2 | 5/2006 |

(56) References Cited

FOREIGN PATENT DOCUMENTS

EP          1354507        10/2007
WO      2006013458 A1      2/2006

* cited by examiner

SEGMENTED DISTRIBUTION ASSEMBLY FOR DISTRIBUTING FLUID TO AN APPLICATOR NOZZLE

CROSS-REFERENCE TO RELATED APPLICATION

The present application is a U.S. nonprovisional patent application of, and claims priority under 35 U.S.C. § 119(e) to, U.S. provisional patent application Ser. No. 62/760,198, filed Nov. 13, 2018, and entitled, "SEGMENTED DISTRIBUTION ASSEMBLY FOR DISTRIBUTING FLUID TO AN APPLICATOR NOZZLE," which '198 application is incorporated by reference herein in its entirety.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates to applicators for applying fluids to traveling substrates, and particularly to applicators for applying foamed chemicals, such as dyes, to traveling sheets of textile substrates.

Background

Applicators for applying foamed chemicals, such as dyes, and other fluids to traveling substrates, such as traveling sheets of textile substrates, have been in use for many years. A specific example of such an apparatus is disclosed and illustrated in U.S. Pat. No. 6,814,806, wherein foamed dye is fed through a distribution chamber assembly in advance of being discharged through the nozzle outlet. For purposes of background and illustration, portions of the disclosure of U.S. Pat. No. 6,814,806 are set forth below and in FIGS. 1-5. As shown in FIG. 1, a fluid application or distribution assembly including the present invention is shown generally at 10 and is preferably incorporated into a free-standing apparatus 12 for treating a textile fabric, web or other traveling sheet-like substrate 8. In this regard, the present invention can be used to treat a wide variety of substrates 8, including substantially continuous fabrics or sheets, woven or non-woven sheets or even sheet-like arrays of strands or filaments of various materials.

The apparatus 12 includes a floor-supported frame 14, including opposed end frame members 16 in a generally parallel and upright arrangement and spaced sufficiently apart to permit the substrate 8 being treated to travel therebetween. The distribution assembly 10 can be welded or otherwise affixed to the end frame members 16 with one or more applicators 18 extending transversely or laterally across the path of the longitudinally traveling substrate 8. Notably, the assembly 10 in FIG. 1 is arranged to treat the substrate 8 from above, but in other versions, the applicator or applicators 18 are arranged and positioned for applying the fluid from either side of a vertically disposed substrate and/or or from below a horizontally disposed substrate.

FIG. 2 is a perspective view of a multi-unit applicator in the apparatus of FIG. 1, with exterior components thereof partially broken away to partially reveal interior components thereof. The fluid application assembly 10 typically includes one or more fluid applicator 18, each having a housing or body 20 with a fluid inlet 22 on one side for communicating treating fluid (foamed or non-foamed) thereto from a fluid source 24, which can be one or more fluid reservoirs, foam generators, or other containers or vessels containing dyes, sizings, foams or other treating fluids. One or more fluid outlet or nozzle 26 is provided for the fluid applicators 18 on the opposite side of the body 20 from the fluid inlets 22 and is positioned in close proximity with the substrate 8 for application of the treating fluid thereto as the substrate 8 travels longitudinally past the applicators 18. In FIG. 2, a common elongated nozzle 26 is provided for all of the fluid applicators 18 and extends laterally or transversely all the way across the path of the longitudinally traveling substrate 8, but the fluid nozzle 26 can alternatively include separate and distinct nozzles for each applicator 18, typically in a line with even spacing therebetween.

FIGS. 3 and 4 are schematic cross-sectional views of portions of the multi-unit applicator 18 of FIG. 2, taken along lines 3-3 and 4-4, respectively. With reference to FIGS. 2-4, the body 20 of each applicator 18 may include top and bottom plates 25,27 surrounding an inner plate assembly 35. The underside of the top plate 25 forms a top wall 28 of a fluid lower surface of a fluid distribution chamber 34, while a bottom wall 30 of the chamber 34 is formed by the upper surface of the bottom plate 27. The top and bottom walls 28,30 of the chamber 34 are spaced apart but interconnected by "radially" outer side walls 32, which as shown in FIG. 2 are often of a substantially arcuate or substantially parabolic shape. The fluid distribution chamber 34 provides fluid communication between the fluid inlets 22 and the nozzle or nozzles 26.

As shown in FIGS. 3 and 4, the inner plate assembly 35 includes a central baffle member 36 and a frame 37 held in place by two side members 39. The central baffle member 36 is disposed within the fluid distribution chamber 34, which is partially formed by the frame 37. The baffle member 36 is typically arranged and oriented in a plane substantially parallel to the traveling substrate 8, which is shown moving left to right in FIG. 3 and is moving toward the viewer in FIG. 4. The baffle member 36 includes top and bottom surfaces 38,40, which are spaced from the respective top and bottom walls 28,30 to define a fluid passageway therebetween. Similarly, the baffle member 36 includes radially outer baffle edge surfaces 42 spaced apart from the outer side walls 32, which are formed by inner surfaces of the frame 37 of the inner plate assembly 35. As shown in FIG. 2, the outer side walls 32 of the chamber 34 and the outer edge surfaces 42 of the baffle 36 are preferably both parabolic or are otherwise substantially complementary in shape to one another.

In order to support and maintain the baffle member 36 in such spatial disposition within the fluid distribution chamber 34, the inner plate assembly 35 preferably includes a plurality of support members 44 (visible in FIGS. 2 and 3) interconnect the baffle member 36 with the outer frame 37 and are preferably as small as possible in order to avoid unduly interfering with the flow of the treating fluid through the fluid passageway between the baffle edge walls 42 and the outer side walls 32. It should be noted that although the baffle top and bottom surfaces 38,40 and the top and bottom walls 28,30 of the distribution chamber 34 are shown in the drawings as being generally planar, they can alternatively be formed in other non-planar configurations but are usually substantially complementary in shape so as to define substantially uniform respective passageways therebetween, as well as substantially uniform passageways between the baffle edge wall 42 and the outer side walls 32.

The shapes and configurations described above result in a serpentine treating fluid flow path through the one or more fluid applicators 18, as illustrated in FIGS. 3 and 4, in which the arrows represent the flow of the fluid. The treating fluid is first directed divergingly outwardly from the fluid inlet 22 between the top plate 25 and the top of the baffle member 36 to the edge surfaces 42 thereof, through the space between the edge surfaces 42 and the outer side walls 32, then convergingly directed back inwardly toward the nozzle or nozzles 26 in the space between the bottom of the baffle member 36 and the bottom plate 27, where it is then finally discharged from the fluid outlet or nozzle 26 and onto the traveling substrate 8. The "double parabolic" shape (or some other shapes) of the baffle member 36 and the fluid distribution chamber 34 is designed to provide an infinite number of flow paths of the treating fluid from the fluid inlet 22 to the elongated fluid outlet or nozzle 26 that are generally equal in length such that the discharge from the nozzle or nozzles 26 is generally uniform across the width of the substrate 8. FIG. 5 is a top view of the inner plate assembly 35 of FIG. 2, which is typical for a wide machine like the fluid application or distribution apparatus 12 of FIG. 1. Lengthy inner plate assemblies 35 are necessary to accommodate wide widths of traveling sheets, which may be as wide as 6 meters.

Because of the nature of operation of a distribution assembly 10 like the one illustrated herein, fluid, foam, or the like is constantly flowing through the fluid distribution chamber 34. Chemical debris thus regularly accumulates on the surfaces of the chamber 34, and particularly on surfaces of the central baffle member 36. Thus, this type of apparatus requires frequent disassembling to clean chemical debris from the inner plate and from the facing surfaces of the outer plates, and reassembling the inner plates after cleaning. Such disassembling and reassembling involves detaching and reattaching numerous attaching elements, such as screws, and gaskets, and the use of relatively large handling equipment. This can result in two to three days of down time of the application equipment Thus, a need exists for an improved fluid applicator assembly that may be cleaned without requiring the complete disassembly and assembly thereof, thereby minimizing handling problems and down time.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

The present invention includes many aspects and features. Moreover, while many aspects and features relate to, and are described in, the context of textile dyeing, the present invention is not limited to use only in textile dyeing, as will become apparent from the following summaries and detailed descriptions of aspects, features, and one or more embodiments of the present invention.

Broadly defined, the present invention according to one aspect relates to an inner plate assembly for arrangement between top and bottom plates of an applicator for applying fluid-based chemicals to traveling sheets of textile substrates. The inner plate assembly includes a plurality of interlocking plate segments each including an outer frame segment and one or more baffle member segments supported by the outer frame segment. Each interlocking plate segment includes a first interlocking structure disposed at a first end thereof and a second interlocking structure at a second, opposite end thereof to facilitate end-to-end interlocking arrangement of the plurality of interlocking plate segments.

In a feature of this aspect, each first interlocking structure and each second interlocking structure of each interlocking plate segment includes a receptacle, extending inwardly from the respective end of the interlocking plate segment, having an entry portion that is more narrow than an interior portion, and each first interlocking structure and each second interlocking structure of each interlocking plate segment further includes a knob, protruding outwardly from the respective end of the interlocking plate segment, having a proximal neck portion that is more narrow than a distal knob portion. In another feature of this aspect, when the interlocking plate segments are in end-to-end interlocking arrangement, the knob of one of the plurality of interlocking plate segments is matingly received within the receptacle of an adjacent one of the plurality of interlocking plate segments.

In another feature of this aspect, the first interlocking structure of each interlocking plate segment includes a generally T-shaped receptacle extending inwardly from the first end of the respective interlocking plate segment, and the second interlocking structure of each interlocking plate segment includes a generally T-shaped knob protruding outwardly from the second end of the respective interlocking plate segment. In another feature of this aspect, when the interlocking plate segments are in end-to-end interlocking arrangement, the generally T-shaped knob of one of the plurality of interlocking plate segments is matingly received within the generally T-shaped receptacle of an adjacent one of the plurality of interlocking plate segments. In another feature of this aspect, the first and second interlocking structures are symmetric about a center line of the respective interlocking plate segment.

In another feature of this aspect, when the interlocking plate segments are in end-to-end interlocking arrangement, a removal tool is connected to an endmost one of the interlocking plate segments. In another feature of this aspect, the removal tool includes an interlocking structure in interlocking arrangement with the interlocking structure of the endmost one of the interlocking plate segments. In another feature of this aspect, the removal tool includes a handle that is wider than a width of the interlocking plate segments.

In another feature of this aspect, when the interlocking plate segments are in end-to-end interlocking arrangement, an end piece is connected to an endmost one of the interlocking plate segments. In another feature of this aspect, the end piece includes an interlocking structure in interlocking arrangement with the interlocking structure of the endmost one of the interlocking plate segments.

In another feature of this aspect, when the interlocking plate segments are in end-to-end interlocking arrangement, a removal tool is connected to a first endmost one of the interlocking plate segments and an end piece is connected to a second endmost one of the interlocking pate segments.

In another feature of this aspect, each interlocking plate segment includes a single baffle member segment supported by the outer frame segment.

In another feature of this aspect, each interlocking plate segment includes at least two baffle member segments supported by the outer frame segment.

In another feature of this aspect, each baffle member segment has a double-parabolic shape.

In another feature of this aspect, each baffle member segment defines a serpentine fluid flow path.

Broadly defined, the present invention according to one aspect includes a method of removing an inner plate assembly from between top and bottom plates of an applicator for applying fluid-based chemicals to traveling sheets of textile substrates. The method includes: connecting a removal tool to an endmost one of a plurality of interlocking plate segments of the inner plate assembly; pulling the removal tool away from the top and bottom plates to expose the endmost one of the plurality of interlocking plate segments; separating the endmost one of the plurality of interlocking plate segments from a next one of the plurality of interlocking plate segments and from the removal tool; and repeating the connecting, pulling, and separating steps for the next and each additional one of the plurality of interlocking plate segments until all interlocking plate segments of the inner plate assembly are removed.

In a feature of this aspect, the removal tool includes an interlocking structure for matingly connecting with a corresponding interlocking structure of each interlocking plate segment.

In another feature of this aspect, the interlocking structure of the removal tool includes a receptacle, extending inwardly from an end of the removal tool, having an entry portion that is more narrow than an interior portion, and the interlocking structure of the removal tool further includes a knob, protruding outwardly from the end of the removal tool, having a proximal neck portion that is more narrow than a distal knob portion.

In another feature of this aspect, the interlocking structure of the removal tool includes a generally T-shaped knob protruding outwardly from an end thereof.

In another feature of this aspect, pulling the removal tool includes laterally pulling the removal tool.

In another feature of this aspect, separating the endmost one of the plurality of interlocking plate segments from the next one of the plurality of interlocking plate segments includes lifting the endmost one relative to the next one.

In another feature of this aspect, the removal tool includes a handle that is wider than a width of the interlocking plate segments.

Further areas of applicability of the present invention will become apparent from the detailed description provided hereinafter. It should be understood that the detailed description and specific examples, while indicating preferred embodiment(s) of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
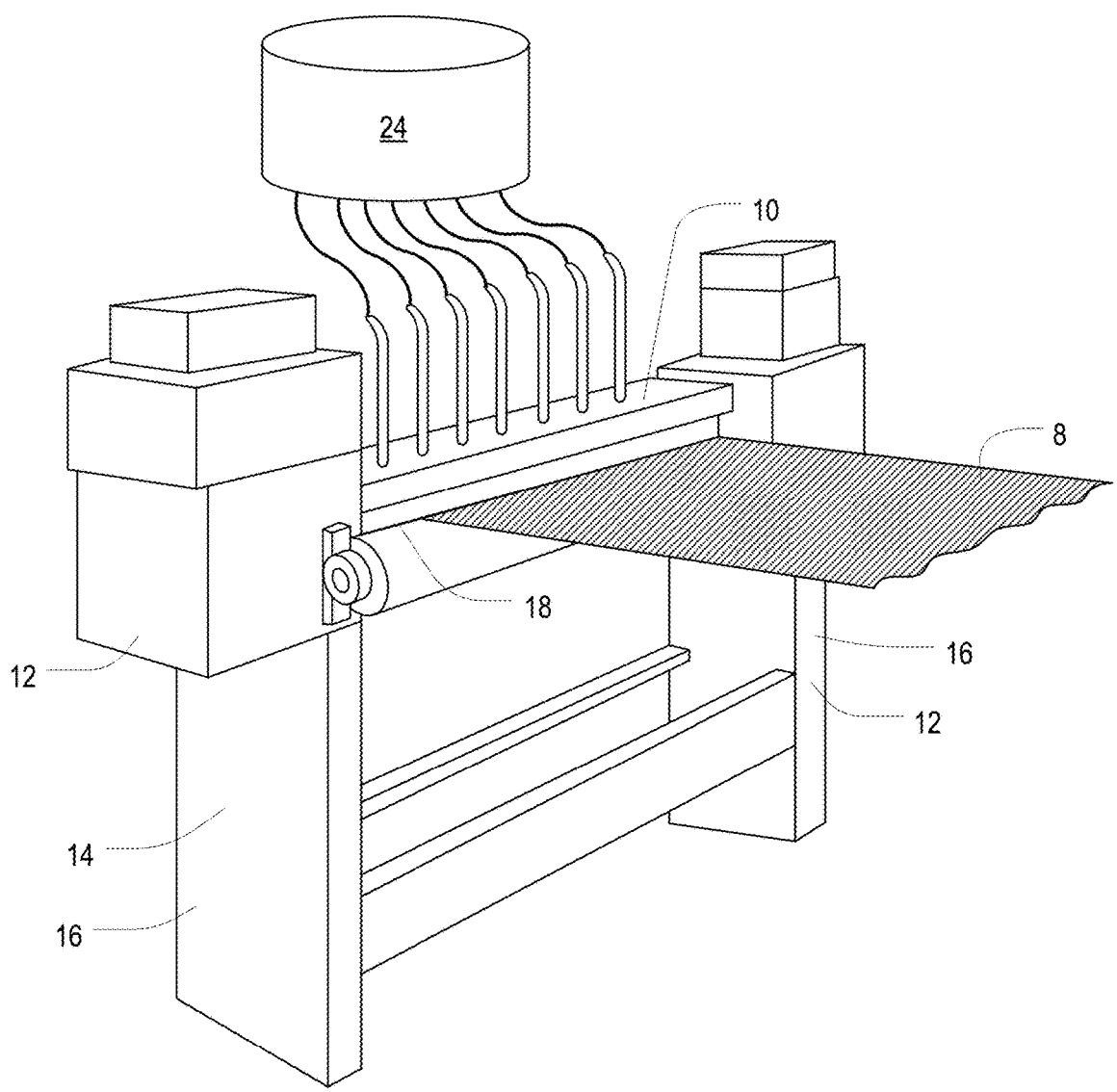
FIG. 1 is a perspective view of a prior art fluid distribution apparatus for applying a treating fluid to a textile fabric, web, or other traveling sheet-like substrate.
Figure 2:
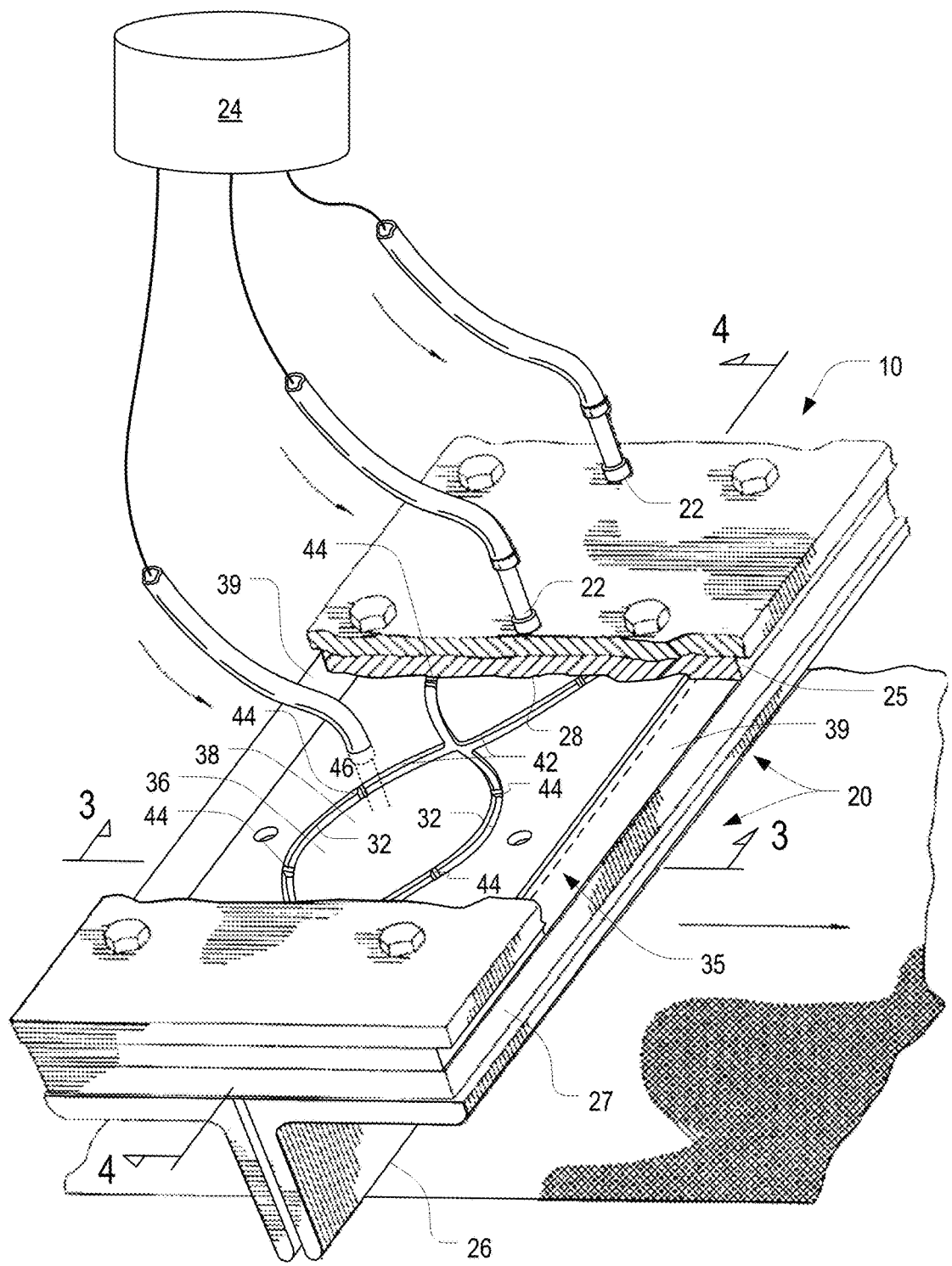
FIG. 2 is a perspective view of a multi-unit applicator in the apparatus of FIG. 1, with exterior components thereof partially broken away to partially reveal interior components thereof.
Figure 3:
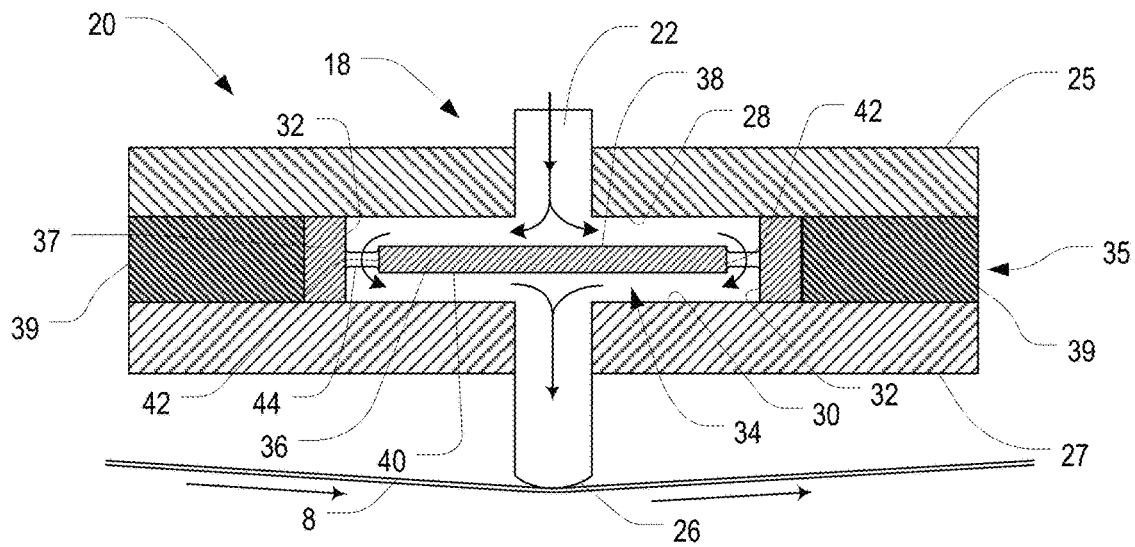
FIGS. 3 and 4 are schematic cross-sectional views of portions of the multi-unit applicator of FIG. 2, taken along lines 3-3 and 4-4, respectively.
Figure 4:
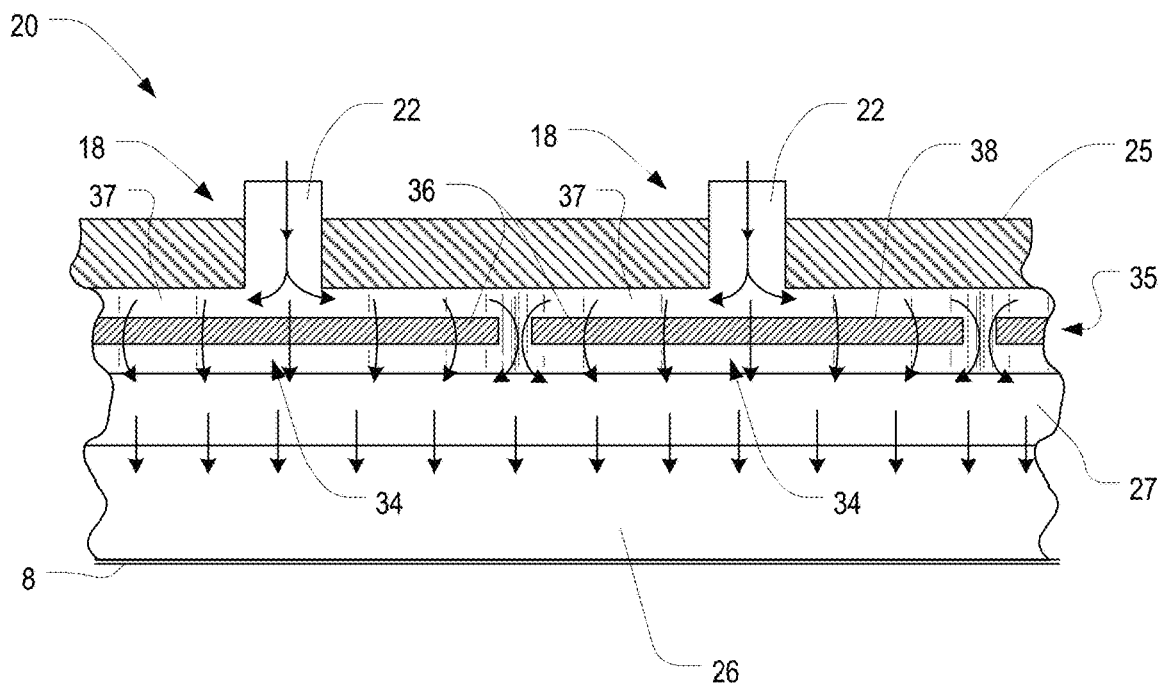

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Furthermore, an embodiment of the invention may incorporate only one or a plurality of the aspects of the invention disclosed herein; only one or a plurality of the features disclosed herein; or combination thereof. Moreover, many embodiments, including adaptations, variations, modifications, and equivalent arrangements, are implicitly disclosed herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing here from, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Further, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiments is merely exemplary in nature and is in no way intended to limit the invention, its implementations, or uses.

Figure 6:
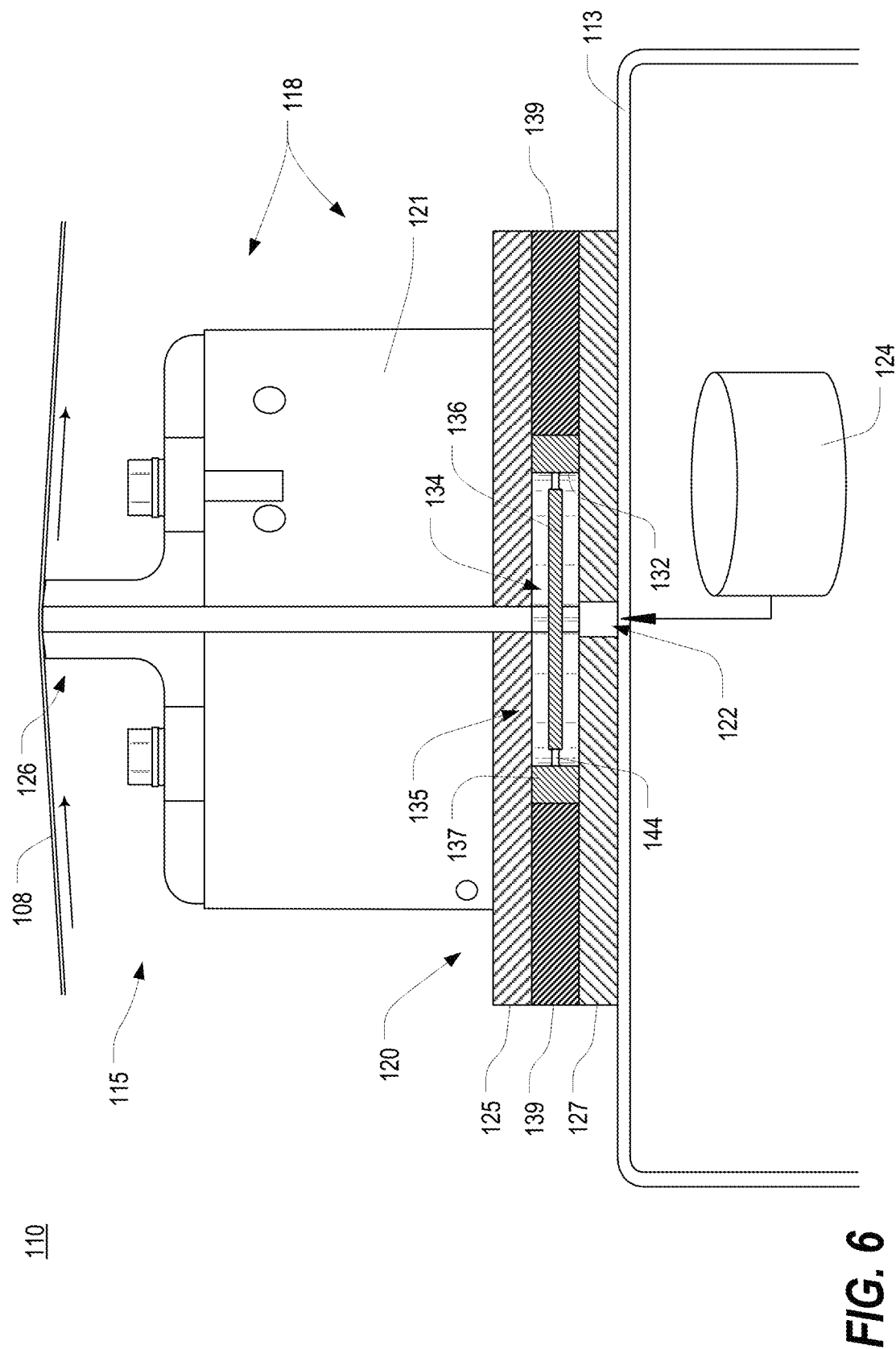
FIG. 6 is a side cross-sectional view of a fluid distribution assembly for use in applying a treating fluid to a textile fabric, web, or other traveling sheet-like substrate in accordance with one or more preferred embodiments of the present invention.

FIG. 6 is a side cross-sectional view of a fluid distribution assembly 110 for use in applying a treating fluid to a textile fabric, web, or other traveling sheet-like substrate in accordance with one or more preferred embodiments of the present invention. The fluid distribution assembly 110 may be incorporated into a fluid distribution apparatus like the apparatus 10 of FIG. 1. Notably, the fluid distribution assembly 110 of FIG. 6 is arranged to direct the treatment fluid upward toward a substrate 108 traveling horizontally above the assembly 110. However, in other versions, the fluid distribution assembly 110 is arranged and positioned for applying the fluid from either side of a vertically disposed substrate and/or or from above a horizontally disposed substrate, as in FIG. 1.

As shown in FIG. 6, fluid distribution assembly 110 includes a fluid applicator 118 mounted on a frame 113. The fluid applicator 118 includes a nozzle assembly 115 and a housing or body 120 with a centrally located foam supply opening 122 on one side for communicating treating fluid (foamed or non-foamed) thereto from a fluid source 124, which can be one or more fluid reservoirs, foam generators, or other containers or vessels containing dyes, sizings, foams or other treating fluids. The nozzle assembly 115 includes one or more fluid seal chamber 121 and an outlet or nozzle 126 are provided for the fluid applicator 118 on the opposite side of the body 120 from the fluid inlet 122 and is positioned in close proximity with the substrate 108 for application of the treating fluid thereto as the substrate 108 travels longitudinally past the applicator 118. In various embodiments, a common elongated nozzle 126 is provided and extends laterally or transversely all the way across the path of the longitudinally traveling substrate 108, but the fluid nozzle 126 can alternatively include separate and distinct nozzles, typically in a line with even spacing therebetween. In the illustrated embodiment, the outlet or nozzle 126 is a slot that extends the width of the nozzle assembly 115.

The body 120 includes top and bottom plates 125,127 surrounding an inner plate assembly 135. The underside of the top plate 125 forms a top wall of a fluid distribution chamber 134, while a bottom wall of the chamber 134 is formed by the upper surface of the bottom plate 127. The top and bottom walls of the chamber 134 are spaced apart but interconnected by side walls 132. The inner plate assembly 135 includes a central baffle member 136 and a frame 137 and held in place by two side members 139. The central baffle member 136 is typically arranged and oriented in a plane substantially parallel to the traveling substrate 108. The baffle member 136 is recessed within the inner plate assembly 135 such that fluid passageways are created above and below the baffle member 136. Gaps are located between the central baffle member 136 and the outer frame 137 such that fluid can flow from the bottom passageway into the upper passageway through such gaps.

Figure 5:
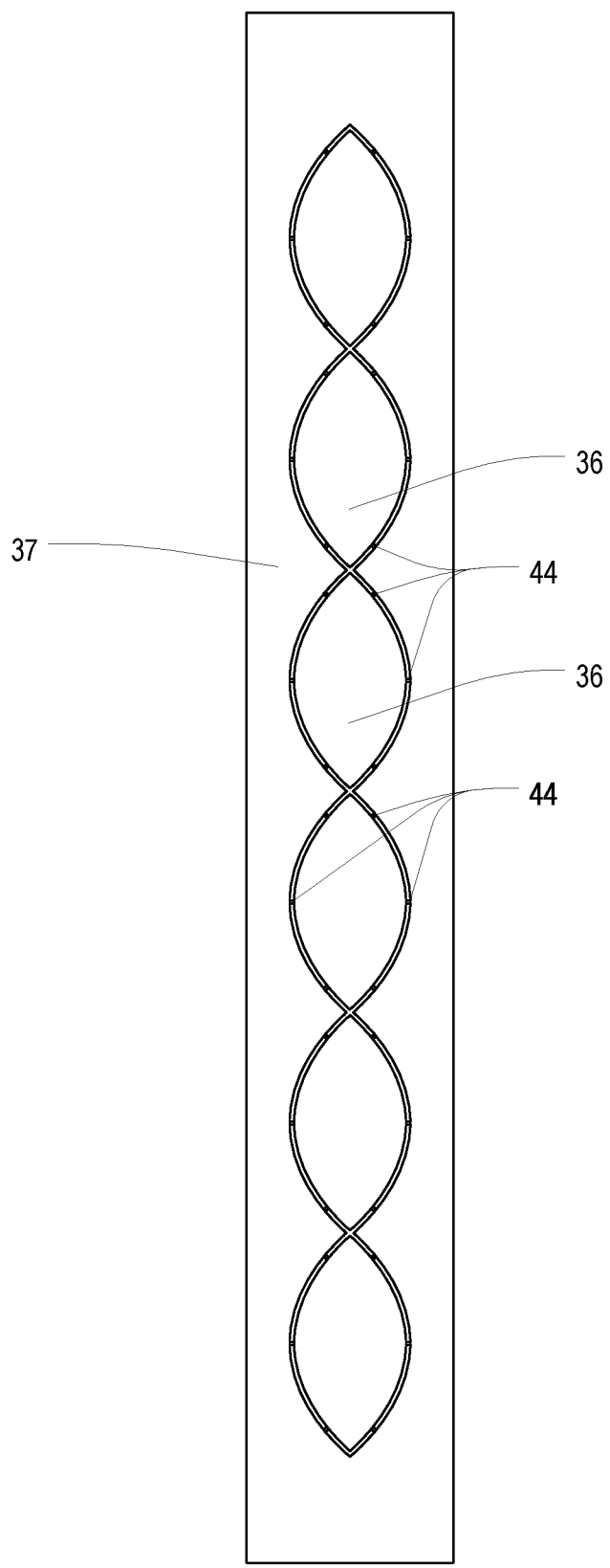
FIG. 5 is a top view of the inner plate assembly of FIG. 2.
Figure 7:
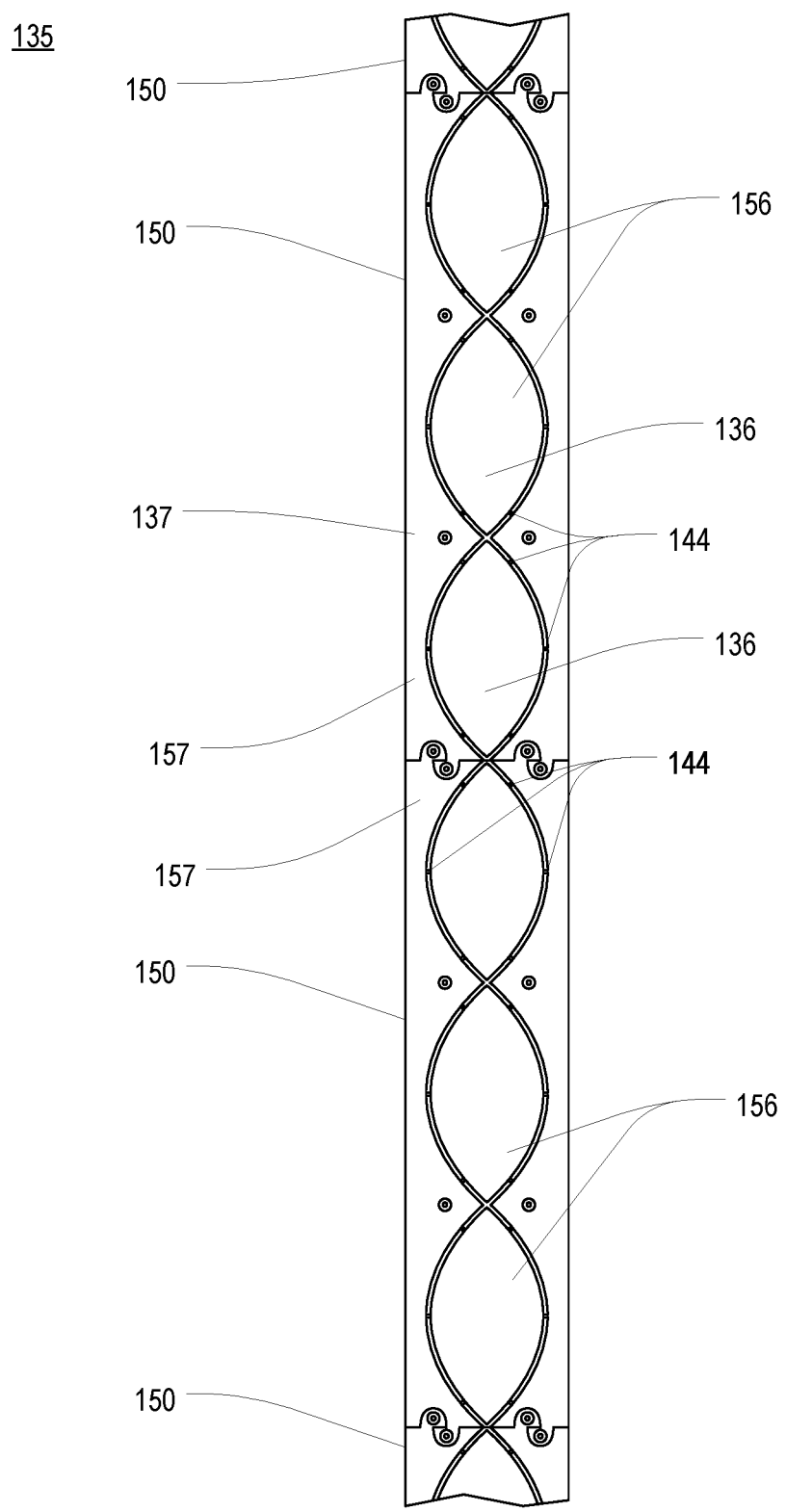
FIG. 7 is a fragmentary top view of the inner plate assembly of FIG. 6.

FIG. 7 is a fragmentary top view of the inner plate assembly 135 of FIG. 6. In order to support and maintain the baffle member 136 in such spatial disposition within the fluid distribution chamber 134, the inner plate assembly 135 preferably includes a plurality of support members 144 that interconnect the central baffle member 136 with the outer frame 137 and are preferably as small as possible in order to avoid unduly interfering with the flow of the treating fluid through the gaps between the baffle member 136 and outer frame 137. The "double parabolic" shape of the gap between the baffle member 136 and outer frame 137 is similar to that of the gap in the inner plate assembly 36 of FIG. 5, and is designed to provide an infinite number of flow paths of the treating fluid from the fluid inlet 122 to the elongated fluid outlet or nozzle 126 that are generally equal in length such that the discharge from the nozzle or nozzles 126 is generally uniform across the width of the substrate 108. However, other shapes may alternatively be utilized.

Figure 8:
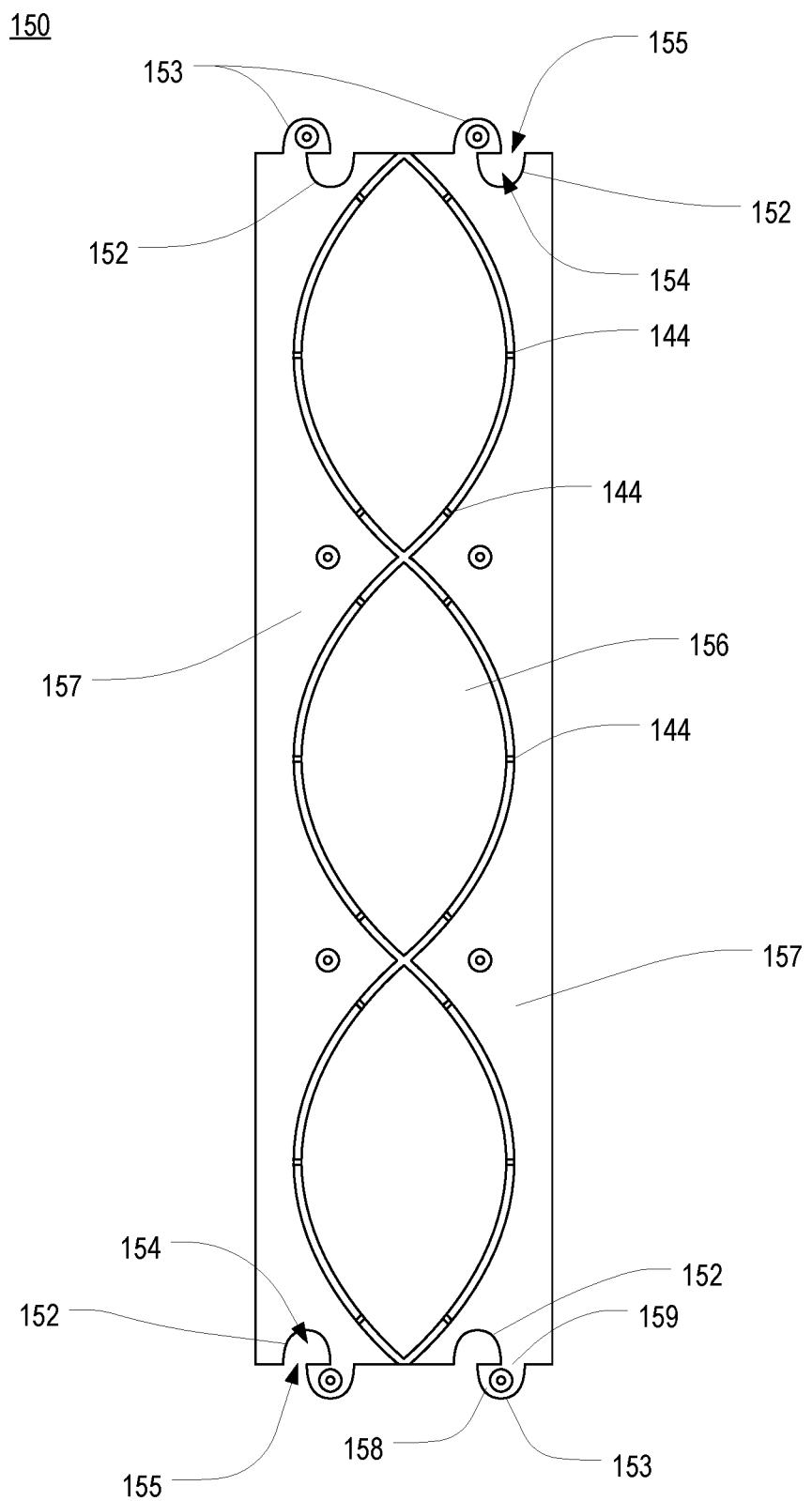
FIG. 8 is an enlarged top view of one of the interlocking plate segments of the inner plate assembly of FIG. 7.
Figure 9:
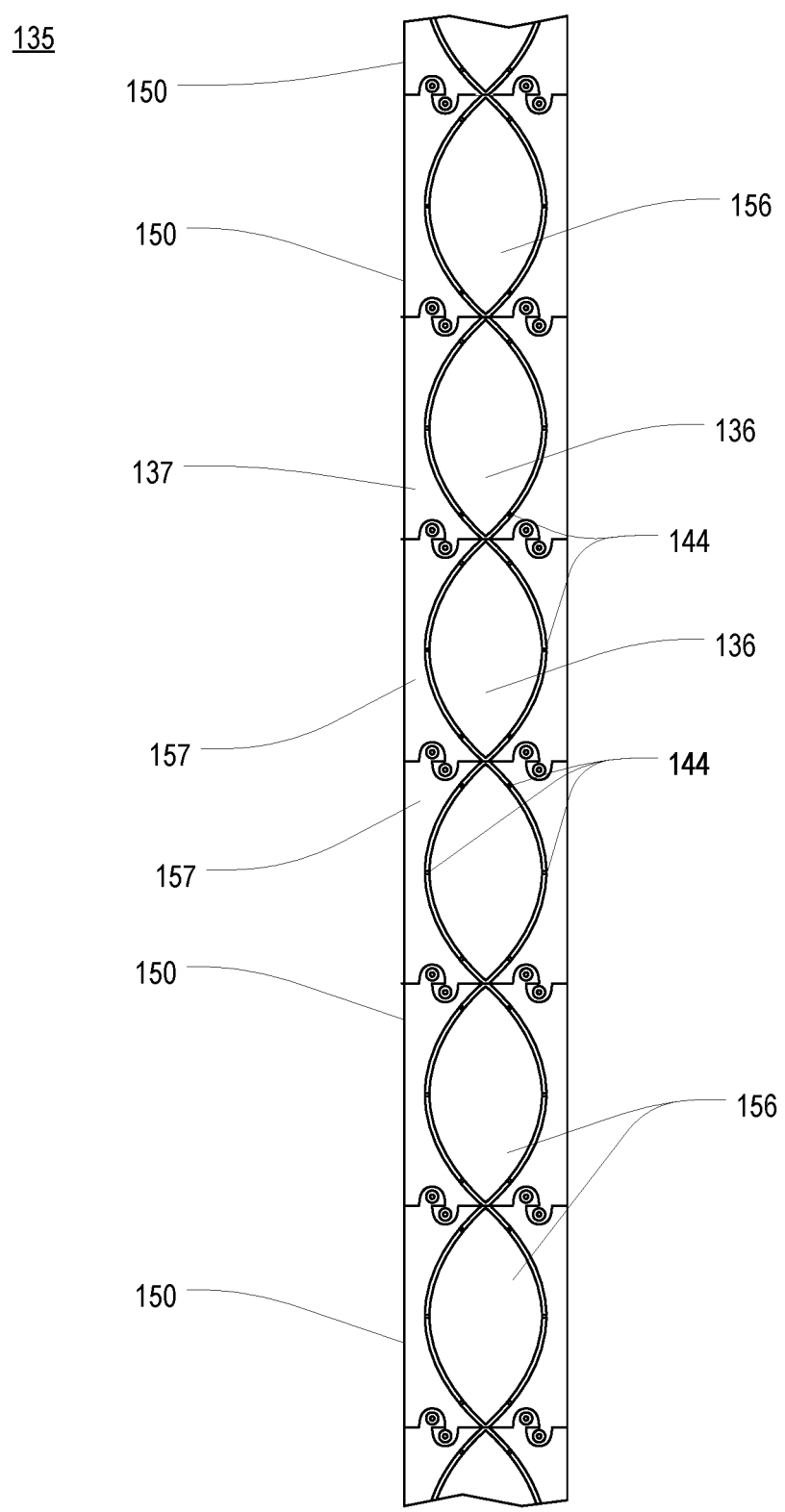
FIG. 9 is a fragmentary top view of an alternative inner plate assembly for use in the assembly of FIG. 6 in accordance with one or more further embodiments of the present invention.

Notably, the inner plate assembly 135 of FIG. 7 is made up of a plurality of interlocking plate segments 150. FIG. 8 is an enlarged top view of one of the interlocking plate segments 150 of the inner plate assembly 135 of FIG. 7. Each plate segment 150 includes one or more baffle member segment 156 supported by an outer frame segment 157. In at least some embodiments, three incremental double-parabolic shapes are provided per segment; however, the number of double-parabolic shapes per segment can be varied from less than one per segment (i.e., one double-parabolic shape extending across several segments linked together) to one double-parabolic shape per segment (for example, as shown in FIG. 9) to more than three double-parabolic shapes per segment. Furthermore, it will be appreciated that differently shaped baffle members and gaps may be utilized with the resulting shapes being distributed across the plate segments accordingly without departing from the scope of the present invention.

As shown in FIG. 7, the segments 150 are connected to each other via pairs of interlocking structures 152,153 disposed at respective ends of the segments 150. In at least some embodiments, each pair of interlocking structures includes a first interlocking structure 152 in the form of a slot or receptacle, with each receptacle having a narrow entry 155 extending inwardly from the end of the segment and opening into an enlarged interior 154, and a second interlocking structure 153 in the form of a knob 158 having a narrow neck 159 and extending away from the end of the segment 150. The knob 158 is aligned and precisely configured to mate with the corresponding receptacles 152 of the adjacent segment 150. With this interlocking arrangement, the segments 150 can only be separated from one another by lifting one segment 150 relative to the one next to it. Because the inner plate assembly 135 is retained between the adjacent upper and lower plates 125,127, vertical movement of the inner plate assembly 135 as a whole is not possible, and thus the segments 150 cannot be separated from one another so long as they are retained between the upper and lower outer plates 125,127.

Notably, however, the segments 150 may be separated and removed by first sliding the inner plate assembly 135 sufficiently out from between the adjacent plates 125,127 to expose a segment 150 for lifting sufficiently to allow the knob and receptacle connection to be separated and thereby free the exposed segment 150 for independent removal and cleaning. This withdrawing and separating of adjacent segments 150 continues, usually one at a time (or in some cases, in subsets of the overall inner plate assembly 135), until all of the segments 150 have been removed.

Figure 10:
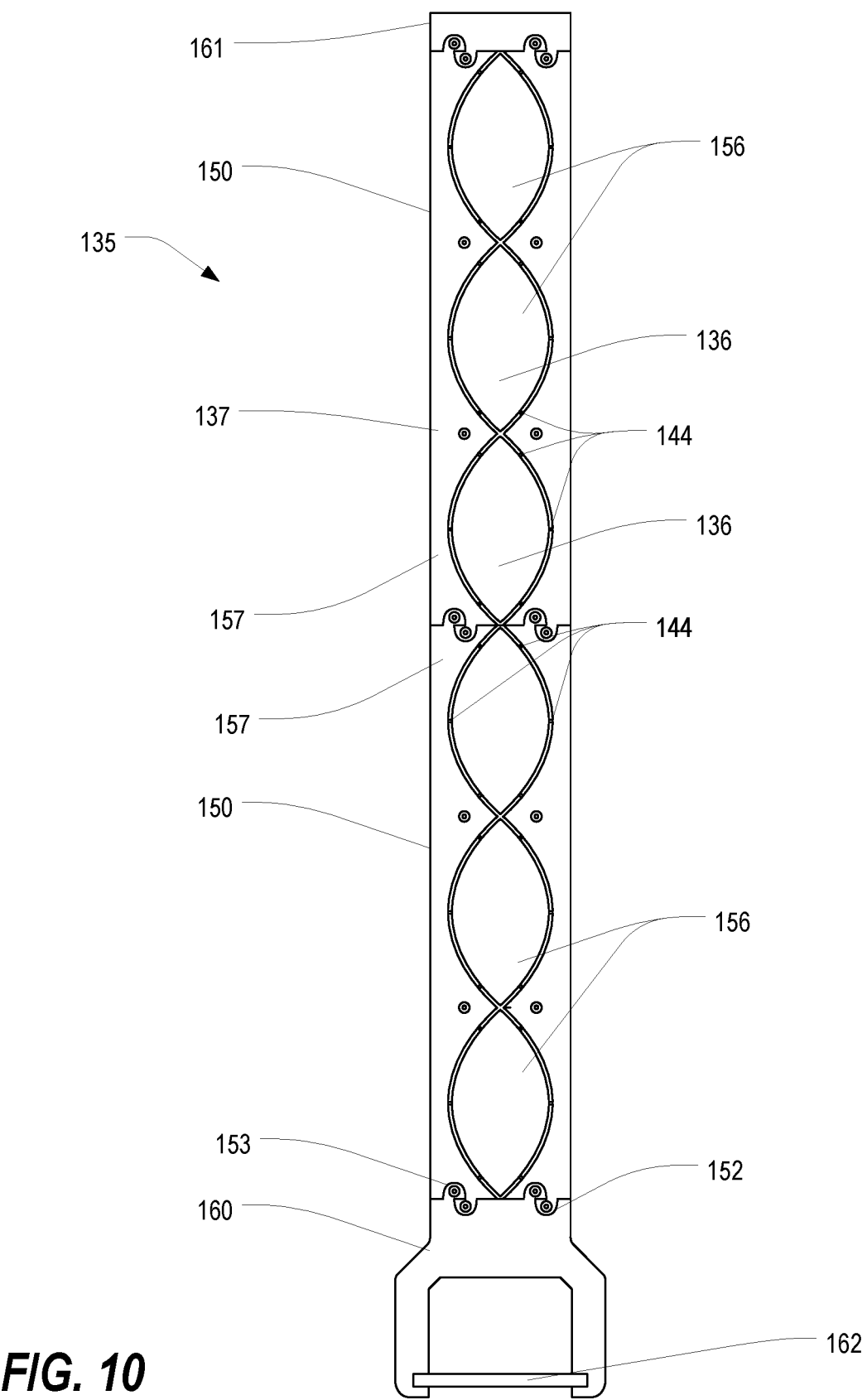
FIG. 10 is a top view of a removal tool disposed at one end of the inner plate assembly of FIG. 7 and an optional end piece disposed at the opposite end.

To facilitate the process of removing the segments 150, a removal tool 160 may be provided. In this regard, FIG. 10 is a top view of a removal tool 160 disposed at one end of the inner plate assembly 135 of FIG. 7 and an optional end piece 161 disposed at the opposite end. As shown therein, the removal tool 160 may be connected to the endmost segment 150 of the inner plate assembly 135 via similar pairs of interlocking structures 152,153 disposed at respective ends of the endmost segment 150 and the removal tool 160. In at least some embodiments, the interlocking structures 152,153 are identical to those used to connect segments 150 together. Notably, the interlocking structures 152,153 on the removal tool 160 are disposed only at one end thereof, while a handle 162 is provided at the opposite end. By manipulating the handle 162 of the removal tool 160, a technician can engage the receptacles 152 of the endmost segment 150 and pull it from between the upper and lower plates 125,127 until the opposite end of the segment 150 is exposed sufficiently to permit the endmost segment 150 to be removed. After the first segment 150 has been removed, further segments 150 can be engaged by the tool 160 for sequential removal.

In at least some embodiments, the removal tool 160 may be left in place at the end of the inner plate assembly 135 while the fluid distribution assembly 110 is in use. In some of these embodiments, the removal tool 160 may be inserted partway into the space between the upper and lower plates 125,127. At least in these embodiments, the handle 162 is preferably arranged to extend at least partially from between the upper and lower plates 125,127 so as to permit grasping by the technician or other user. Furthermore, in at least some of these embodiments, the handle 162 or some other portion of the removal tool 160 is wider than the opening between the plates 125,127 or otherwise serves as a gate to prevent the removal tool 160 to be accidentally inserted too far into the space between the plates 125,127.

Figure 11:
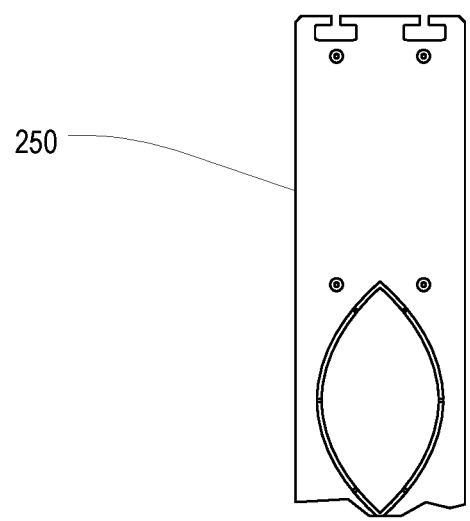
FIG. 11 is a fragmentary top view of a portion of another alternative inner plate assembly for use in the assembly of FIG. 6 in accordance with one or more further preferred embodiments of the present invention.
Figure 12:
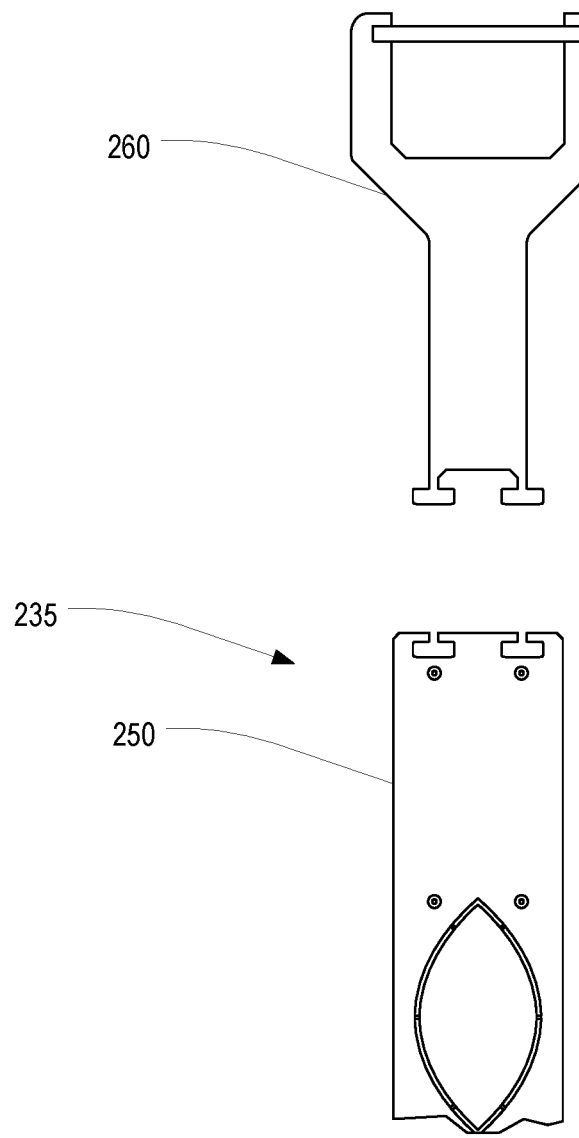
FIG. 12 is a fragmentary top view of the portion of the inner plate assembly of FIG. 11 with a corresponding removal tool shown next to it.

It will be appreciated that the interlocking structures may take on various shapes. For example, FIG. 11 is a fragmentary top view of a portion of another alternative inner plate assembly 235 for use in the assembly of FIG. 6 in accordance with one or more further preferred embodiments of the present invention. In the inner plate assembly 235 of FIG. 11, the receptacles and knobs are each generally T-shaped. A wide variety of alternative shapes are likewise possible without departing from the scope of the present invention so long as the interlocking connection is strong enough to allow segments 150 to be pulled from between the plates 125,127 without adjacent segments 150 becoming accidentally detached from one another inside the apparatus. Notably, the interlocking structures in the inner plate assembly 235 of FIG. 11 are symmetric about a center line of the segments 250, thereby allowing the segments 250 and/or corresponding removal tool to be flipped upside down if desired, whereas the segments 150 of FIG. 7 do not have this capability (but do have the capability of being flipped end to end if desired). FIG. 12 is a fragmentary top view of the portion of the inner plate assembly 235 of FIG. 11 with a corresponding removal tool 260 shown next to it.

It will also be appreciated that the number of interlocking pairs may vary from the two pairs disclosed at each end of each segment 150. For example, in some embodiments, a single pair (rather than two pairs) of interlocking structures may be sufficient, while in other embodiments, three pairs may be desirable.

Figure 13:
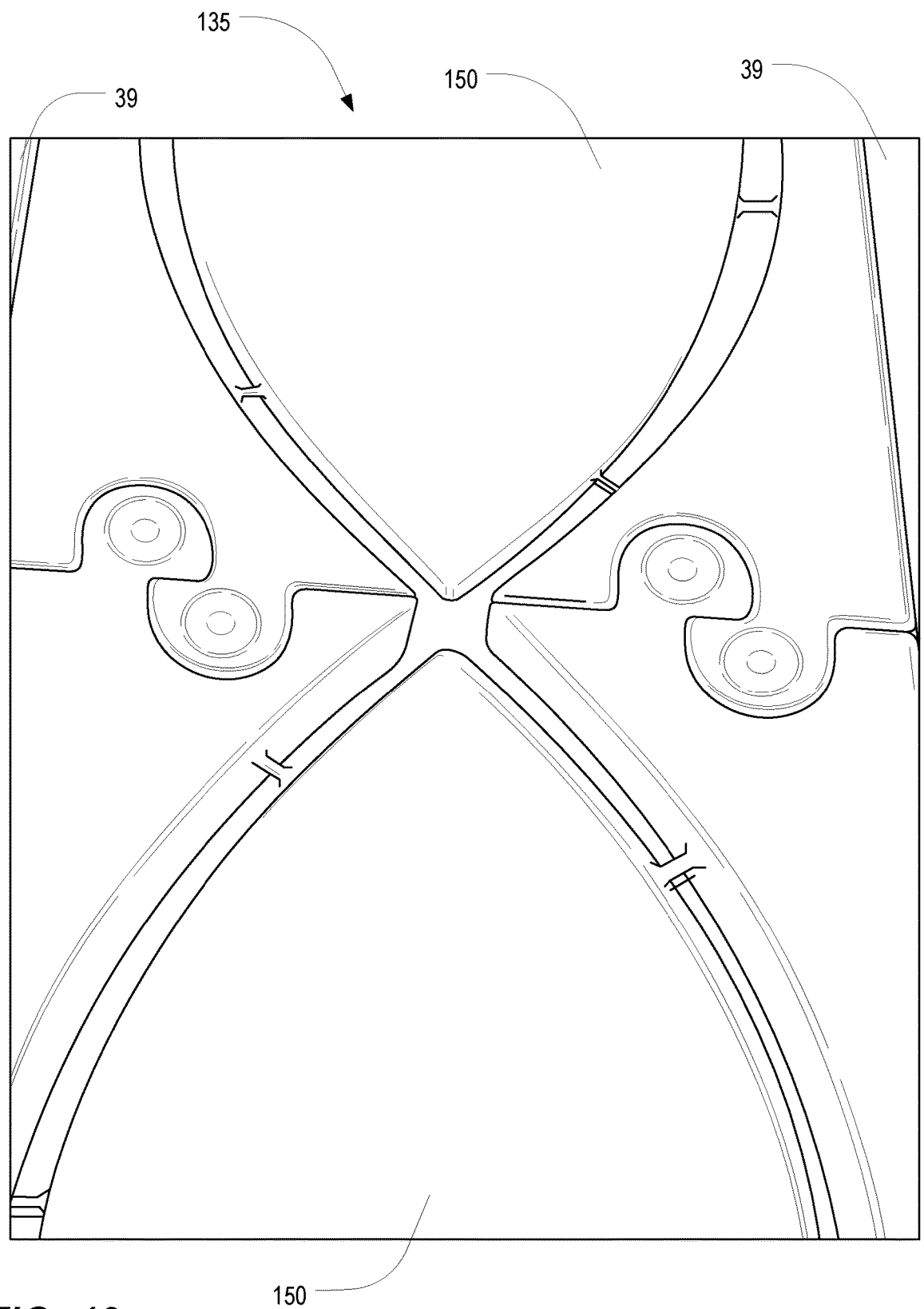
FIGS. 13, 14, and 15 are pictorial illustrations of portions of the inner plate assembly of FIG. 7 being assembled/disassembled using a removal tool.
Figure 14:
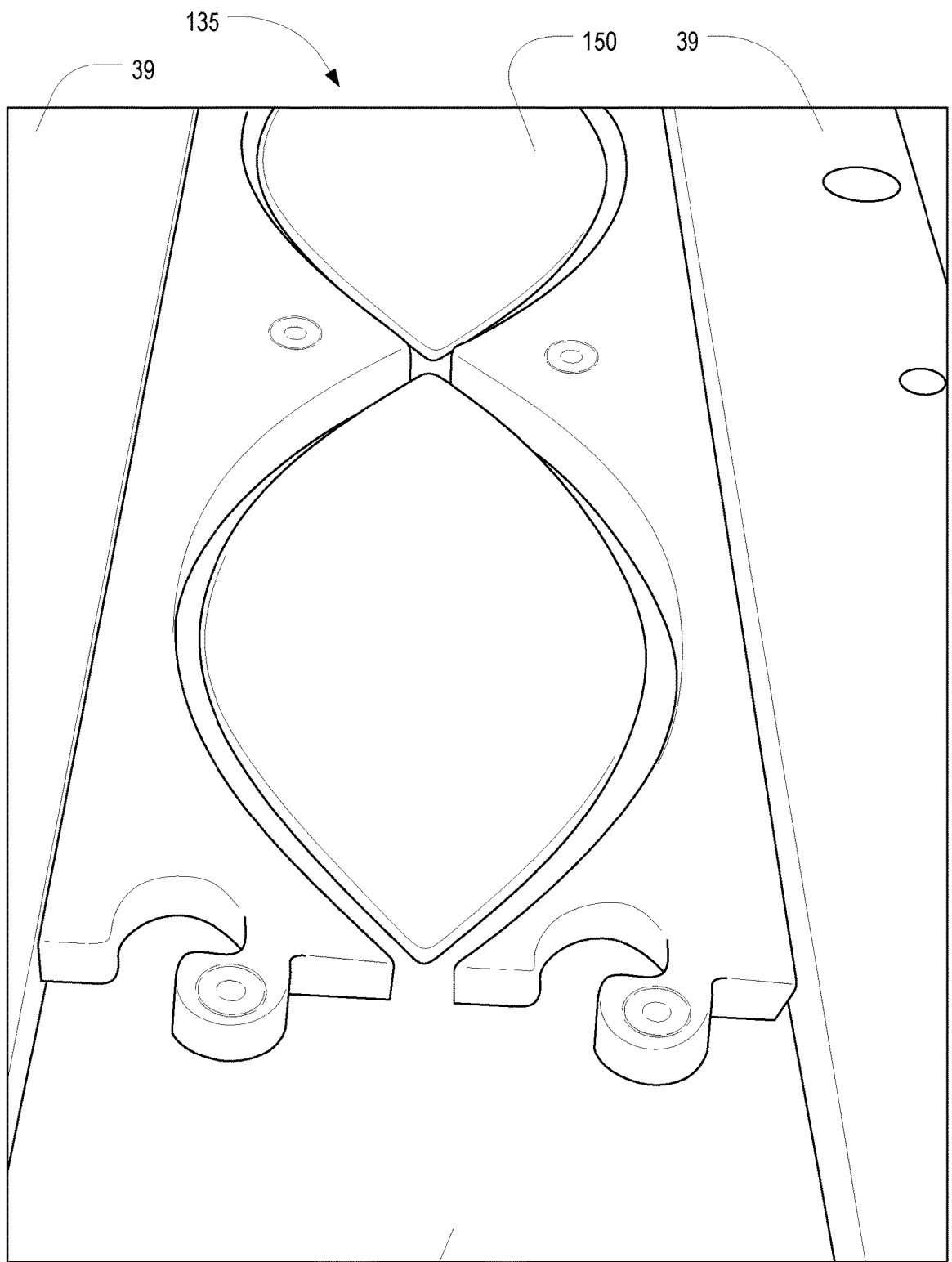
Figure 15:
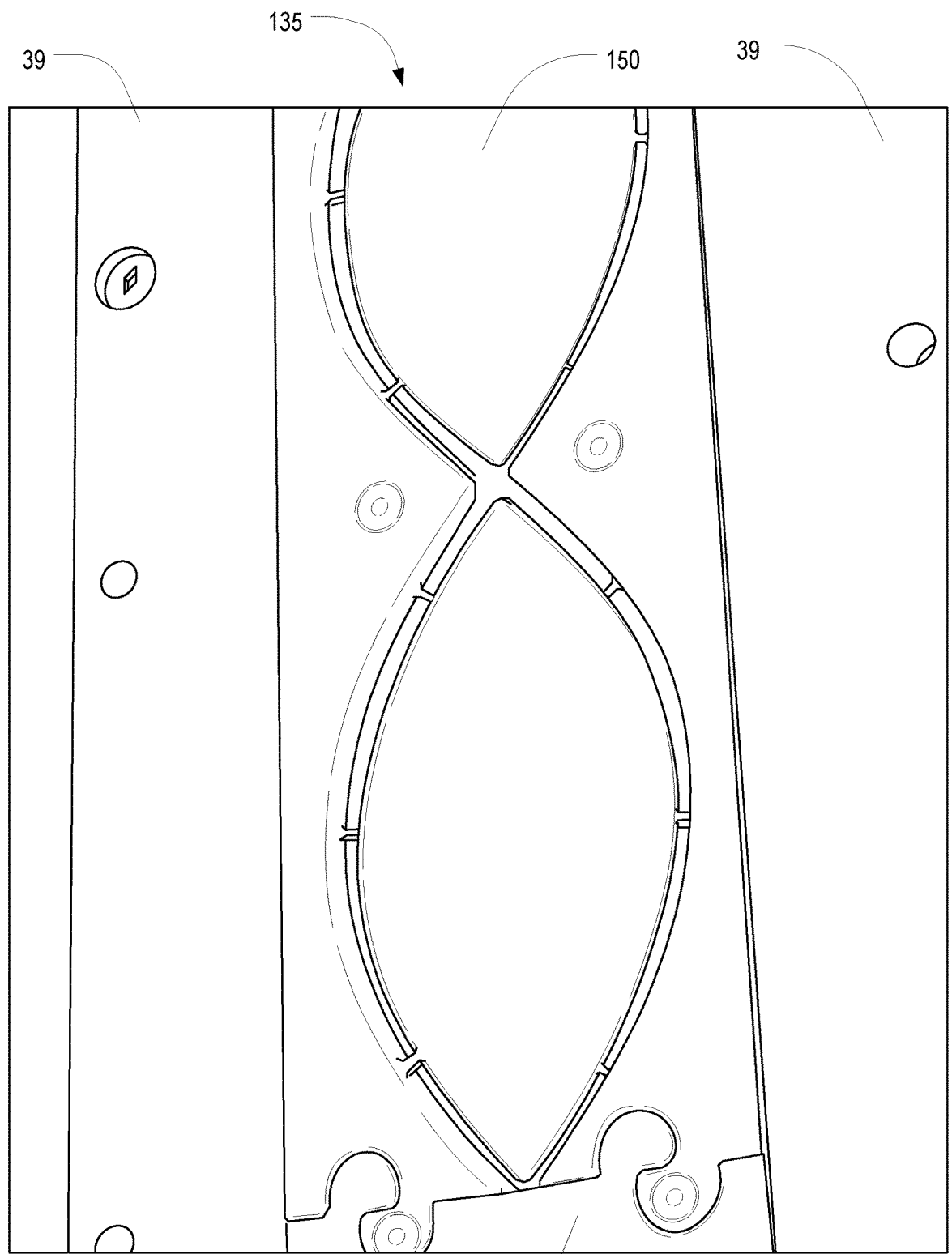

Advantageously, the present invention addresses problems associated with handling long inner plates that extend across the full width of wide traveling sheets 8, particularly when withdrawing such plates from the distribution chamber and when cleaning such plates. Portions of this process are illustrated in FIGS. 13, 14, and 15. As described herein, the inner plate assembly 135 is formed as a sequence of separable interlocking plate segments 150, which can be sequentially separated as the inner plate assembly 135 is being slid from the body 120 of the fluid applicator 118 for easy handling individually, and can be easily reattached sequentially as the inner plate assembly 135 is reassembled in the fluid distribution chamber 134. In use, the end member that conventionally covers the end of the fluid distribution chamber 134 is removed (or in at least some embodiments is omitted entirely) such that the inner plate assembly 135 can extend through and beyond the space previously occupied by such end member. There it can be engaged by a removal tool 160,260, usually but not always beyond the ends of the top and bottom plates 125,127, to slide the inner plate assembly 135 out. The segments of the inner plate assembly 135, as well as the surfaces of the top and bottom plates 125,127, can then be cleaned and otherwise serviced, following which the inner plate assembly 135 can be slid back into place. All of this can be accomplished rather quickly without requiring disassembling and reassembling the top and bottom plates 125,127.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claim(s) appended hereto and the equivalents thereof.

What is claimed is:

1. An inner plate assembly for arrangement between top and bottom plates of an applicator for applying fluid-based chemicals to traveling sheets of textile substrates, the inner plate assembly comprising a plurality of interlocking plate segments each including an outer frame segment and one or more baffle member segments supported by the outer frame segment, wherein each interlocking plate segment includes a first interlocking structure disposed at a first end thereof and a second interlocking structure at a second, opposite end thereof to facilitate end-to-end interlocking arrangement of the plurality of interlocking plate segments, and wherein, when the interlocking plate segments are in end-to-end interlocking arrangement, a removal tool is connected to an endmost one of the interlocking plate segments.

2. The inner plate assembly of claim 1, wherein each first interlocking structure and each second interlocking structure of each interlocking plate segment includes:
    a receptacle, extending inwardly from the respective end of the interlocking plate segment, having an entry portion that is more narrow than an interior portion; and
    a knob, protruding outwardly from the respective end of the interlocking plate segment, having a proximal neck portion that is more narrow than a distal knob portion.

3. The inner plate assembly of claim 2, wherein, when the interlocking plate segments are in end-to-end interlocking arrangement, the knob of one of the plurality of interlocking plate segments is matingly received within the receptacle of an adjacent one of the plurality of interlocking plate segments.

4. The inner plate assembly of claim 1, wherein:
    the first interlocking structure of each interlocking plate segment includes a generally T-shaped receptacle extending inwardly from the first end of the respective interlocking plate segment; and
    the second interlocking structure of each interlocking plate segment includes a generally T-shaped knob protruding outwardly from the second end of the respective interlocking plate segment.

5. The inner plate assembly of claim 4, wherein, when the interlocking plate segments are in end-to-end interlocking arrangement, the generally T-shaped knob of one of the plurality of interlocking plate segments is matingly received within the generally T-shaped receptacle of an adjacent one of the plurality of interlocking plate segments.

6. The inner plate assembly of claim 4, wherein the first and second interlocking structures are symmetric about a center line of the respective interlocking plate segment.

7. An inner plate assembly for slidable arrangement between top and bottom plates and side members of an applicator for applying fluid-based chemicals to traveling sheets of textile substrates, the inner plate assembly comprising:
    (a) a first interlocking plate segment, adapted to slide between the side members of the applicator and between the top and bottom plates of the applicator, the first interlocking plate segment including:
        (ii) a first outer frame segment and one or more baffle member segments supported thereby, and
        (ii) a first interlocking structure disposed at a distal end of the first outer frame segment;
    (b) a second interlocking plate segment, adapted to slide between the side members of the applicator and between the top and bottom plates of the applicator, the second interlocking plate segment including:
        (i) a second outer frame segment and one or more baffle member segments supported thereby, and
        (ii) a second interlocking structure disposed at a proximal end of the second outer frame segment;
    (c) wherein the second interlocking plate segment is disposed at the distal end of the first interlocking plate segment with the second interlocking structure of the second interlocking plate segment being interlocked in end-to-end interlocking arrangement with the first interlocking structure of the first interlocking plate segment; and
    (d) wherein the first interlocking plate segment further includes a third interlocking structure at a proximal end of the first outer frame segment, wherein the second interlocking plate segment includes a fourth interlocking structure at a distal end of the second outer frame segment, wherein the third interlocking structure is structurally identical to the second interlocking structure, and wherein the fourth interlocking structure is structurally identical to the first interlocking structure.

8. The inner plate assembly of claim 7, wherein the first interlocking structure and the second interlocking structure each include:
    a receptacle, extending inwardly from the respective end of the respective interlocking plate segment, having an entry portion that is more narrow than an interior portion; and
    a knob, protruding outwardly from the respective end of the respective interlocking plate segment, having a proximal neck portion that is more narrow than a distal knob portion.

9. The inner plate assembly of claim 8, wherein, when the first and second interlocking plate segments are in end-to-end interlocking arrangement, the knob of one of the first or second interlocking plate segments is matingly received within the receptacle of the second or first, respectively, interlocking plate segment.

10. The inner plate assembly of claim 7, wherein:

the first interlocking structure of the first interlocking plate segment includes a generally T-shaped receptacle extending inwardly from the distal end thereof; and the second interlocking structure of the second interlocking plate segment includes a generally T-shaped knob protruding outwardly from the proximal end thereof.

11. The inner plate assembly of claim 10, wherein, when the interlocking plate segments are in end-to-end interlocking arrangement, the generally T-shaped knob of the first interlocking plate segment is matingly received within the generally T-shaped receptacle of the second interlocking plate segment.

12. The inner plate assembly of claim 10, wherein the first and second interlocking structures are symmetric about a center line of the interlocking plate segments.

13. An inner plate assembly for slidable arrangement between top and bottom plates and side members of an applicator for applying fluid-based chemicals to traveling sheets of textile substrates, the inner plate assembly comprising:

(a) a first interlocking plate segment, adapted to slide between the side members of the applicator and between the top and bottom plates of the applicator, the first interlocking plate segment including:

(i) a first outer frame segment and one or more baffle member segments supported thereby, and (ii) a first interlocking structure disposed at a distal end of the first outer frame segment;

(b) a second interlocking plate segment, adapted to slide between the side members of the applicator and between the top and bottom plates of the applicator, the second interlocking plate segment including:

(i) a second outer frame segment and one or more baffle member segments supported thereby, and (ii) a second interlocking structure disposed at a proximal end of the second outer frame segment;

(c) wherein the second interlocking plate segment is disposed at the distal end of the first interlocking plate segment with the second interlocking structure of the second interlocking plate segment being interlocked in end-to-end interlocking arrangement with the first interlocking structure of the first interlocking plate segment; and (d) wherein, when the interlocking plate segments are in end-to-end interlocking arrangement, a removal tool is connected to the proximal end of the first interlocking plate segment.

14. The inner plate assembly of claim 13, wherein the first interlocking plate segment further includes a third interlocking structure at a proximal end of the first outer frame segment, wherein the second interlocking plate segment includes a fourth interlocking structure at a distal end of the second outer frame segment, wherein the third interlocking structure is structurally identical to the second interlocking structure, and wherein the fourth interlocking structure is structurally identical to the first interlocking structure.

15. The inner plate assembly of claim 14, wherein the first interlocking structure and the second interlocking structure each include:

a receptacle, extending inwardly from the respective end of the respective interlocking plate segment, having an entry portion that is more narrow than an interior portion; and a knob, protruding outwardly from the respective end of the respective interlocking plate segment, having a proximal neck portion that is more narrow than a distal knob portion.

16. The inner plate assembly of claim 15, wherein, when the first and second interlocking plate segments are in end-to-end interlocking arrangement, the knob of one of the first or second interlocking plate segments is matingly received within the receptacle of the second or first, respectively, interlocking plate segment.

17. The inner plate assembly of claim 14, wherein:

the first interlocking structure of the first interlocking plate segment includes a generally T-shaped receptacle extending inwardly from the distal end thereof; and the second interlocking structure of the second interlocking plate segment includes a generally T-shaped knob protruding outwardly from the proximal end thereof.

18. The inner plate assembly of claim 17, wherein, when the interlocking plate segments are in end-to-end interlocking arrangement, the generally T-shaped knob of the first interlocking plate segment is matingly received within the generally T-shaped receptacle of the second interlocking plate segment.

19. The inner plate assembly of claim 17, wherein the first and second interlocking structures are symmetric about a center line of the interlocking plate segments.

\* \* \* \* \*